United States Patent Office 3,473,927
Patented Oct. 21, 1969

3,473,927
DOUBLE NEGATIVE EXPOSURE METHOD FOR PHOTOSENSITIVELY OPACIFIABLE GLASS
Guenter H. Loose, Bradford, Pa., assignor to Corning Glass Works, Corning, N.Y., a corporation of New York
No Drawing. Filed Dec. 14, 1965, Ser. No. 513,839
Int. Cl. G03c 5/06
U.S. Cl. 96—36                                   2 Claims

ABSTRACT OF THE DISCLOSURE

Light is directed upon a block of photosensitively opacifiable glass through two superimposed photographic negatives having superimposed light transparent areas of different size. The photographic negative having the smaller transparent area is removed and additional light is directed through the remaining photographic negative onto the glass block. Upon heating of the glass block, the portion thereof having the double exposure forms an opal having a density different from the portion of the glass block receiving only a single exposure. Upon treating the glass block with an acid solution, the opal is etched at a differential rate depending upon the density of the opal.

---

This invention relates to the manufacture of glass articles bearing surface designs as the result of depth etching or through etching or a combination of both.

Surface designs of this type can be generally produced to a limited extent in preformed glass articles by mechanical grinding, or by acid etching wherein the glass surface is coated with an acid-insoluble resist, such as wax, selected portions of the resist are removed to form a design therein, and the design is etched into the exposed glass surface by treatment with hydrofluoric acid. Mechanical grinding, if sufficiently prolonged, can perforate the glass and in this manner individual holes extending through the glass and filigrees of the simplest type can be produced. For purposes requiring little or no accuracy of dimension, relatively large holes are sometimes melted through a glass article by means of a sharp flame or an electric arc. Holes and coarse filigrees of simple types may also be formed in a glass article during its fabrication by molding the molten glass or by molding and sintering powdered glass.

The mechanical grinding of glass is a slow and laborious process and the production of anything more than the simplest design thereby requires a high degree of manual skill. Moreover, the minimum dimensions of lines, depressions and holes, and the intricacy of the designs which may thus be produced in glass, are limited by the relatively large size of the tools which must be employed and the brittleness of glass, as well as by the skill of the operator. Acid-etching, on the other hand, although more facile than mechanical grinding and fairly accurate for the shallow cutting of lines, lacks accuracy in deep cuts and is generally unsatisfactory for producing filigrees on account of the unavoidable undercutting by the acid. The degree of intricacy of design obtainable by acid etching is not particularly high because of the undercutting, and also because of the difficulty of accurately removing the resist to form the design. Designs formed in the glass by melting or molding it are obviously coarse and simple or crude compared to those which are obtainable by grinding or etching.

A prior method utilized a sheet of photosensitively opacifiable glass which was exposed to light through a negative which has the configuration of the part to be formed thereon. After the exposure the glass sheet was developed in a furnace to form an opal. The glass sheet was then waxed and the parts designated by the opal were etched out by an acid solution. This was relatively simple if the design was to be etched entirely through the glass sheet. However, if a part had a certain design which called for a specified depth only, then the part had to be removed from the etch unit containing the acid solution after a certain period of time when the specified depth had been reached. Then the design was waxed so that no acid could touch it further and the part was then replaced in the etching unit to etch through those areas which were so designated. Since the waxing and rewaxing, necessary with this method, is a manual operation which requires people, it is both time consuming and very costly.

The present invention solves all the above mentioned problems by using two line negatives, the top negative allowing the light to expose the portions of the glass sheet for through etching while the bottom negative shields a design but also lets the light through for the through etching. After the portions for the through etching have been exposed for a certain time at a certain light intensity, the top negative is removed and the glass sheet with the bottom negative is exposed for a certain time at a certain light intensity. Due to the different light intensities and the times the different portions of the glass sheet were exposed, an opal having different densities will be developed in a development furnace. The different densities of the opal will then result in a different etch rate when the glass is placed in the hydrofluoric acid etching bath.

This method eliminates the costly and time consuming waxing operations and enables a design having both through portions and specified depth portions to be formed in a glass sheet quickly and accurately.

The present method of sculpturing glass utilizes a preformed glass article in which is formed in selected portions thereof a design comprising crystallites selected from the class consisting of lithium disilicate or an alkali metal fluoride, while leaving the remaining portion of the glass unaffected, and treating the article with a dilute aqueous solution of hydrofluoric acid to dissolve one of such portions while leaving the other portion substantially unchanged.

Glass articles of this type containing a clear portion and an opacified or light diffusing portion comprising opacifying or light diffusing crystallites of a lithium disilicate or an alkali metal fluoride exhibit a substantial difference between the solubilities of such portions in dilute hydrofluoric acid, whereby one of such portions can be completely dissolved while the other portion is only slightly affected. The more soluble portion when dissolved leaves an exactly corresponding void in the article and if such portion extends completely through the article its removal leaves a hole through the article. By this means designs and filigrees can easily and accurately be carved in the glass without the objectionable undercutting which is characteristic of conventional acid-etching where no solubility differential exists within the glass.

The glass used in the present photographic method is a photosensitively opacifiable glass, that is, a glass in which exposure to short-wave radiations such as ultraviolet radiations, brings about an invisible change whereby the irradiated areas are capable of heat-developed opacification while nonirradiated areas remain substantially unchanged on heating.

Of the various photosensitively opacifiable glasses which are suitable for the present method the following, listed in the patent to Stookey No. 2,628,160 are examples of the desired type of glass. One of these glasses may be a silicate glass containing: 10–25% $Li_2O$ and a photosensitive metal comprising gold, silver or copper equivalent to 0.004–0.05% Au, 0.025–0.3% AgCl or 0.04–1%

Cu$_2$O. When this glass is exposed to short-wave radiations in the conventional manner a latent image is formed which is converted to an opacified image by heating the glass at a temperature below the softening point for a time sufficient to cause precipitation of crystallites of lithium disilicate in the exposed portions of the glass. The opacified portion containing crystallites of lithium disilicate is more soluble in dilute hydrofluoric acid than the clear portion of the glass. The opacified portion of the glass is consequently thereby removed when the article is immersed in dilute hydrofluoric acid while the clear portion remains substantially unchanged.

Another photosensitively opacifiable glass which is suitable for this photographic process is a glass comprised of: 55–75% SiO$_2$, 12–18% of Na$_2$O or a mixture of Na$_2$O and K$_2$O or a mixture of Na$_2$O and Li$_2$O, 2–12% Al$_2$O$_3$, 0.001% to less than 0.01% of gold computed as Au, 0.005–0.05% CeO$_2$ and 1.8–2.4% of analytically determined fluorine. When forming an opacified image in such glass, the article thereof, after exposure to short-wave radiations through the negatives is heated from 5 minutes to 6 hours at a temperature within the range extending from 100° C. below the softening point of the glass up to 50° C. above the softening point, cooled below 520° C. and reheated at a temperature between 540° and 700° C. In such glases the opacified portion containing the alkali metal fluoride is more soluble in dilute hydrofluoric acid than the clear portion of the glass. The opacified portion is therefore removed while the clear portion remains substantially unchanged.

By way of example the following is the process which may be used and which embodies the present invention. A sheet of photosensitively opacifiable glass approximately one-eighth of an inch thick is placed in the center of an exposure frame. Two superimposed line negatives are placed over the glass and secured in the proper position by any suitable means. The negative with the complete pattern (i.e., both the through and depth etch patterns) should be in contact with the glass plate. The negative with the through pattern only should be placed on top of the other negative. The exposure frame is placed on a movable table which is capable of passing back and forth beneath an ultraviolet light source such as a mercury lamp. The light from the mercury lamp is directed against a parabolic mirror to obtain nearly parallel light rays for directing the same at right angles against the exposure frame as it moves back and forth through the light on the movable table. The incidence of parallel light beams and the movement of the table insure a uniform exposure of the photosensitively opacifiable glass through the negatives. The number of passes of the photosensitive glass through the ultraviolet light varies and may be calculated dependent upon the intensity of the light and the time of exposure desired. After the desired number of passes are made with both negatives in place the top negative is removed and an additional number of passes are made so as to expose the glass to the entire pattern to be formed.

Upon completion of the exposure of the photosensitive glass, the glass is then placed in an oven face down, that is, turned over from the way it was exposed, and passed through the oven for approximately 4½ hours. This will develop the latent image into an opacified image in the glass. The developed glass is then flooded by ultraviolet light to darken the color of the glass and to add to the strength of the glass.

The rear surface of the glass plate is then coated with beeswax prior to the etching operation. On some designs where a slight etch effect on the back of a glass plate can be tolerated the back of the glass sheet does not have to be waxed.

The waxed glass plate is now placed in an etching solution comprising a 10% solution of hydrofluoric acid. The opacified portion of the glass plate is now etched away with the through portions being etched at a rate 2 to 3 times faster than the portions which have an opal developed only to a certain depth. After the etching takes place the glass plate is washed thoroughly and the wax is removed from the plate. A chamfer may be ground on the bottom of the through holes but such a step is not absolutely necessary. The glass plate may now be ceramed in order to strengthen the glass plate.

From the foregoing description will be appreciated that a new and improved method of etching photosensitive glass has been discovered and that various changes in the method may be made by those skilled in the art without departing from the spirit of the invention. For example the negatives could be placed one at a time in sequence upon the glass plate and exposed to the ultraviolet light.

I claim:

1. The method of selectively etching a glass article made of transparent photosensitively opacifiable glass, comprising covering a portion of said glass body with a first photographic line negative, said first photographic line negative defining areas for through etching, exposing said covered portion of the article to short-wave radiations to form in a selected portion of the glass body a latent photographic image, covering the same portion of said glass body with a second photographic line negative, said second photographic line negative having a design including areas for through etching, repeating said exposure to form a superimposed latent photographic image, said second negative being positioned so that the areas for through etching overlap said first mentioned image, heating said article to form an opacified opal of two distinct densities while leaving the remaining portion of the glass clear and unopacified and treating the article with a dilute aqueous solution of hydrofluoric acid to differentially etch the opacified portion while leaving the clear portion substantially unchanged.

2. A method according to claim 1 comprising superimposing said photographic line negatives, the first upon the second, on said glass body during the first mentioned exposure, removing the uppermost negative prior to the second mentioned exposure.

References Cited
UNITED STATES PATENTS

| 2,628,160 | 2/1953 | Stookey | 96—88 XR |
| 3,249,436 | 5/1966 | Halpein | 96—44 |

GEORGE F. LESMES, Primary Examiner

R. E. MARTIN, Assistant Examiner

U.S. Cl. X.R.

96—27, 44